United States Patent
Suzuki

(10) Patent No.: US 10,796,110 B2
(45) Date of Patent: Oct. 6, 2020

(54) READING DEVICE AND METHOD

(71) Applicant: TOSHIBA TEC KABUSHIKI KAISHA, Shinagawa-ku, Tokyo (JP)

(72) Inventor: Shigeaki Suzuki, Gotemba Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 16/217,489

(22) Filed: Dec. 12, 2018

(65) Prior Publication Data

US 2019/0188426 A1   Jun. 20, 2019

(30) Foreign Application Priority Data

Dec. 15, 2017 (JP) ................. 2017-240880

(51) Int. Cl.
  *G06K 7/10* (2006.01)
  *G06K 7/015* (2006.01)
  *G06Q 20/20* (2012.01)

(52) U.S. Cl.
  CPC ......... *G06K 7/10099* (2013.01); *G06K 7/015* (2013.01); *G06K 7/10108* (2013.01); *G06K 7/10138* (2013.01); *G06K 7/10336* (2013.01); *G06Q 20/208* (2013.01)

(58) Field of Classification Search
  CPC .......... G06K 7/10099; G06K 7/10336; G06K 7/10108; G06K 7/10138; G06K 7/015; G06K 7/10415; G06Q 20/208; H04B 5/0068; H04B 5/0062
  See application file for complete search history.

(56) References Cited

U.S. PATENT DOCUMENTS

| | | | | |
|---|---|---|---|---|
| 4,800,254 A | * | 1/1989 | Suzuki | G07F 5/18 235/375 |
| 7,825,810 B2 | * | 11/2010 | Sakama | G06K 7/10336 340/572.1 |
| 10,599,890 B1 | * | 3/2020 | Huebner | G07G 1/009 |
| 2005/0159913 A1 | * | 7/2005 | Ariyoshi | G06K 7/0008 702/122 |
| 2009/0101712 A1 | * | 4/2009 | Ulrich | G06Q 10/087 235/383 |

(Continued)

FOREIGN PATENT DOCUMENTS

| EP | 2733644 A4 | * | 1/2015 | ............. G06K 17/00 |
|---|---|---|---|---|
| EP | 2778713 B1 | * | 2/2018 | ............... G06K 7/10 |

*Primary Examiner* — Nader Bolourchi
(74) *Attorney, Agent, or Firm* — Foley & Lardner LLP

(57) ABSTRACT

A reading device includes a placing table supporting an article to which an RFID tag is attached. An antenna is configured to emit a radio wave for communicating with the RFID tag toward the placing table. A reading unit is configured to read tag information including a tag identifier identifying the RFID tag by communicating with the RFID tag via the antenna while the placing table and the antenna are integrally moved. An extracting unit is configured to extract a tag identifier in which an amount of change in phase information is a predetermined value or less, based on the phase information of a response wave obtained from the RFID tag when the tag information is read. An outputting unit is configured to output the tag information including the tag identifier extracted by the extracting unit.

20 Claims, 8 Drawing Sheets

(56) References Cited

U.S. PATENT DOCUMENTS

| | | | |
|---|---|---|---|
| 2009/0201166 A1* | 8/2009 | Itagaki | G01S 13/751 340/686.1 |
| 2009/0231107 A1* | 9/2009 | Sato | H04B 5/0062 340/10.3 |
| 2011/0140380 A1* | 6/2011 | Ulrich | B62B 5/0096 280/33.992 |
| 2011/0221576 A1 | 9/2011 | Itagaki | |
| 2014/0167920 A1* | 6/2014 | Kamiya | G01S 13/58 340/10.1 |
| 2014/0197926 A1* | 7/2014 | Nikitin | G06K 7/10009 340/10.1 |

* cited by examiner

| TAG IDENTIFIER | ANTENNA POSITION | PHASE INFORMATION |
|---|---|---|
| EPC1 | x1 | 100 |
| EPC2 | x2 | 150 |
| EPC1 | x3 | 100 |
| EPC1 | x4 | 100 |
| EPC2 | x5 | 155 |
| EPC1 | x6 | 100 |
| EPC1 | x7 | 100 |

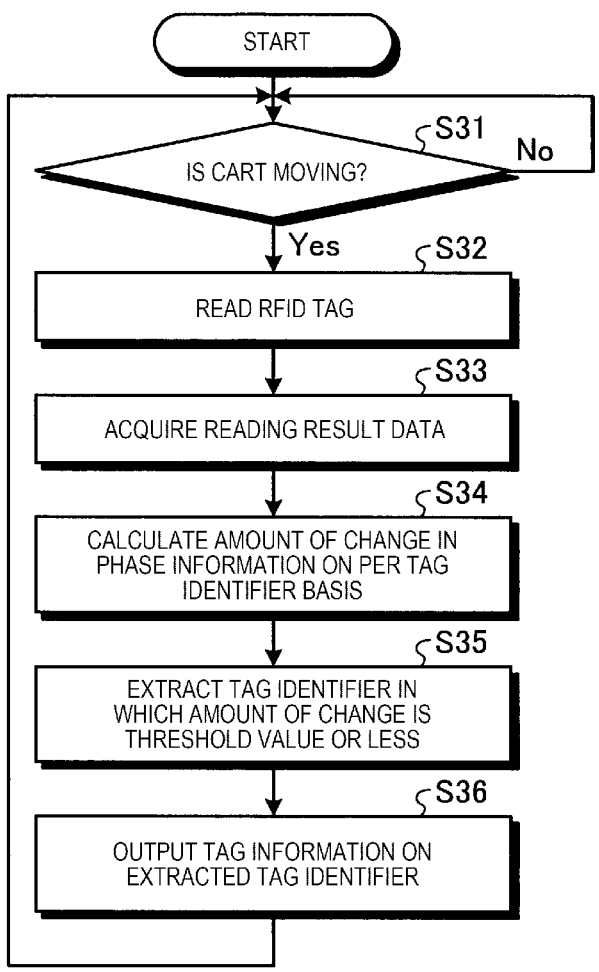

READING DEVICE AND METHOD

CROSS-REFERENCE TO RELATED APPLICATION

This application is based upon and claims the benefit of priority from Japanese Patent Application No. 2017-240880, filed in Dec. 15, 2017, the entire contents of which are incorporated herein by reference.

FIELD

Embodiments described herein relate generally to a reading device and a method.

BACKGROUND

In the related art, there is a reading device that reads information on an article from a radio frequency identification (RFID) tag (referred to as RF tag, wireless tag, or IC tag) attached to an article. In addition, in the related art, there is proposed a reading device capable of reading an RFID tag of an article placed on a placing table by disposing an antenna under the placing table on which the article is placed.

Additionally, in the above reading device, there is a case where an RFID tag of an article not to be read existing above the placing table or the like is read, in addition to an article to be read placed on the placing table. In such a case, since a user determines whether or not information is information on the article to be read while confirming information obtained by reading the RFID tag, there is a possibility that a reading operation is complicated. Therefore, a technique capable of efficiently reading the article to be read is desired.

DESCRIPTION OF THE DRAWINGS

FIG. 12 is a flowchart illustrating an example of reading by the reading device according to the at least one embodiment.

DETAILED DESCRIPTION

An object to be solved is to provide a reading device and a method capable of efficiently reading an RFID tag attached to an article to be read.

According to at least one embodiment, there is a reading device including a placing table on which an article to which an RFID tag is attached is placed, an antenna configured to emit a radio wave for communicating with the RFID tag toward the placing table, a reading unit (reader) configured to read tag information including a tag identifier identifying the RFID tag by communicating with the RFID tag via the antenna while the placing table and the antenna are integrally moved, an extracting unit configured to extract a tag identifier in which amount of change in phase information is a predetermined value or less, based on the phase information of a response wave obtained from the RFID tag when the tag information is read, and an outputting unit configured to output the tag information including the tag identifier extracted by the extracting unit.

Hereinafter, the reading device and the method according to at least one embodiment will be described with reference to the drawings. In the following embodiment, an example of reading a passive type RFID tag attached to a commodity in a retail store such as a supermarket will be described, and the reading is not limited to this embodiment.

First Embodiment

Figure 1:
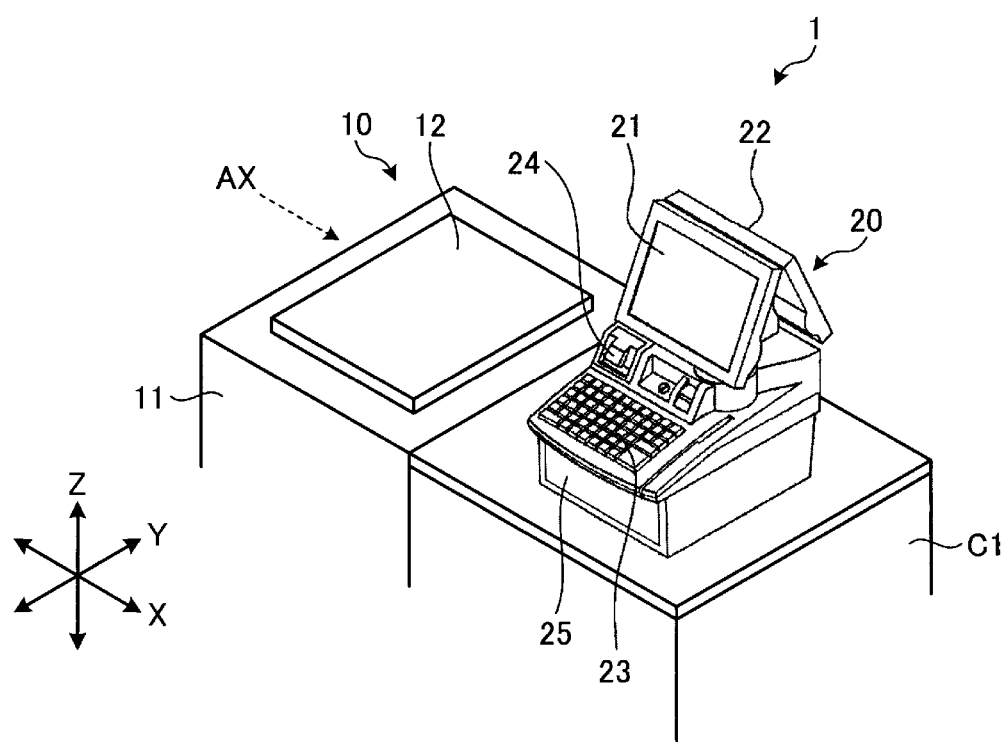
FIG. 1 is a view illustrating an example of an appearance arrangement of a commodity sales data processing apparatus provided with a reading device according to at least one embodiment.

FIG. 1 is a view illustrating an example of an appearance arrangement of a commodity sales data processing apparatus 1 provided with a reading device 10 according to a first embodiment. As illustrated in FIG. 1, the commodity sales data processing apparatus 1 includes the reading device 10 and a POS terminal 20. In FIG. 1, the X direction means the direction in the longitudinal direction (width direction) of the commodity sales data processing apparatus 1 parallel to a placing surface 12a of a placing portion 12 to be described later. The Y direction means the direction in the lateral direction (depth direction) of the commodity sales data processing device 1 parallel to the placing surface 12a of the placing portion 12. The Z direction means the direction in the vertical direction (height direction) of the commodity sales data processing apparatus 1 perpendicular to the placing surface 12a of the placing portion 12.

The reading device 10 is a device that reads tag information held by an RFID tag T1 from the RFID tag T1 attached to a commodity M1 (refer to FIG. 2) as an article. The tag information includes information related to the commodity M1 (commodity code, etc.) to which the RFID tag T1 is attached, in addition to an identifier capable of identifying the RFID tag T1.

The reading device 10 includes a pedestal portion 11 and the placing portion 12. The pedestal portion 11 is a support base for supporting the placing portion 12. The pedestal portion 11 includes a moving portion 14, a control unit 101, and the like described later therein. The placing portion 12 is an example of a placing table. The placing portion 12 includes a flat plate shape and is provided on an upper surface of the pedestal portion 11.

Figure 2:
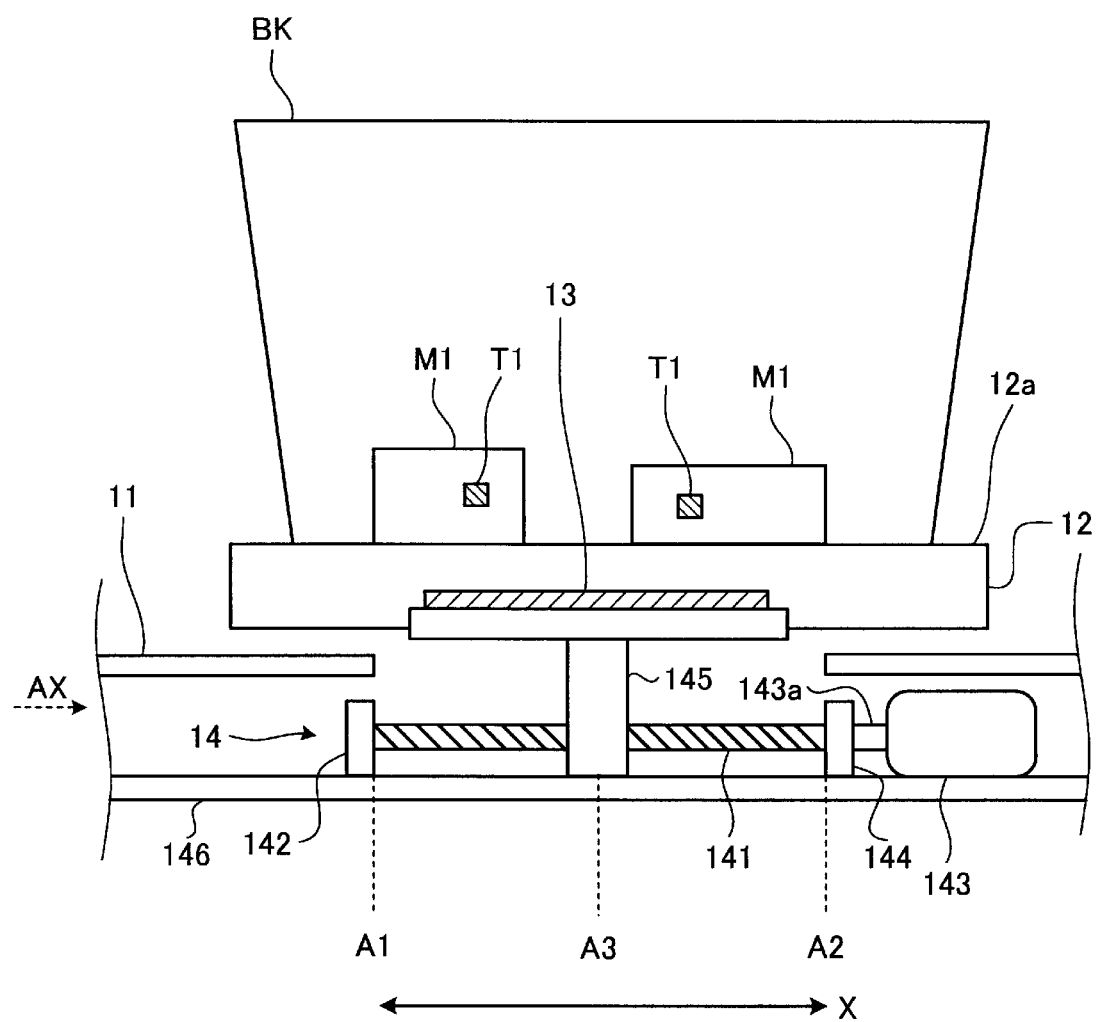
FIG. 2 is a diagram illustrating a schematic configuration of the reading device according to the at least one embodiment.

FIG. 2 is a diagram illustrating a schematic arrangement of the reading device 10 (viewed in the direction of arrow AX in FIG. 1). As illustrated in FIG. 2, on the upper surface of the placing portion 12 (placing surface 12a), the commodity M1 which is an object of a commodity registration, a shopping basket BK inputting the commodity M1, and the like are placed. That is, the commodity M1 to be read is placed on the placing surface 12a. The placing surface 12a is formed of a material (radio wave permeable material) that allows radio waves (electromagnetic waves) to pass through such as plastics, glass, and wood.

An antenna 13 is provided in a lower portion of the placing portion 12 (placing surface 12a). The antenna 13 is, for example, a planar antenna, and is connected to a reader and writer unit 104 (refer to FIG. 3) via a bendable coaxial cable or the like. Under the control of the reader and writer unit 104, the antenna 13 radiates a radio wave (electromagnetic wave) capable of communicating with the RFID tag T1. The antenna 13 radiates radio waves toward the placing surface 12a, so that a communication area (not illustrated) capable of communicating with the RFID tag T1 is formed on the placing surface 12a. The intensity of the radio wave radiated from the antenna 13 is not particularly limited, and the formed communication area can preferably cover the shopping basket BK placed on the placing portion 12.

The placing portion 12 and the antenna 13 are attached to the pedestal portion 11 via the moving portion 14. The moving portion 14 is an example of a moving unit, and integrally moves the placing portion 12 and the antenna 13 in the X direction with respect to the pedestal portion 11. The moving portion 14 is configured to include linear motion mechanisms such as a screw shaft 141, a bearing 142 of the screw shaft 141, a stepping motor 143, a coupling 144, and a moving stage 145.

The stepping motor 143 is a rotational power source. The coupling 144 transmits rotational power of the stepping motor 143 to the screw shaft 141.

One end of the screw shaft 141 is axially rotatable and is horizontally supported by the bearing 142, and the other end is axially rotatable and is horizontally supported by the coupling 144. In addition, an output shaft 143a of the stepping motor 143 is connected to the other end of the screw shaft 141 in the coupling 144. With this configuration, the rotational power of the stepping motor 143 is transmitted from the output shaft 143a to the screw shaft 141 via the coupling 144.

The moving stage 145 is formed integrally with a ball screw nut screwed to the screw shaft 141. Specifically, the moving stage 145 includes a through-hole, and the ball screw nut of the screw shaft 141 is embedded in the through-hole. In addition, the placing portion 12 and the antenna 13 are integrally fixed to the moving stage 145.

By screwing the ball screw nut onto the screw shaft 141, the moving stage 145 advances and retracts in the X direction along the screw shaft 141 together with the rotation of the screw shaft 141. That is, the moving stage 145 integrally moves the placing portion 12 and the antenna 13 in the X direction.

Since a metallic ball (steel ball) is interposed in a threaded portion between the screw shaft 141 and the ball screw nut when moving, the moving stage 145 can move smoothly. In addition, the moving stage 145 slides while contacting a portion of the moving stage 145 to a supporting plate 146 provided inside the pedestal portion 11 so as not to rotate with the rotation of the screw shaft 141. In this manner, the moving portion 14 enables the movement of the moving stage 145 in the uniaxial direction by changing the rotational motion of the stepping motor 143 to the linear motion by the above-described mechanism of the ball screw.

In addition, a sensor unit 106 (refer to FIG. 3) for detecting the position of the moving stage 145 on the screw shaft 141 is provided on the screw shaft 141, the moving stage 145, and the like.

In FIG. 2, the moving portion 14 is a linear motion mechanism using a ball screw, and is not limited to this configuration. For example, the moving portion 14 may be configured to integrally move the placing portion 12 and the antenna 13 by conveying the placing portion 12 (antenna 13) by a belt conveyor or the like.

In addition, in FIG. 2, the moving portion 14 is configured to move the placing portion 12 and the antenna 13 in the X direction, however the moving portion 14 is not limited to this configuration. The moving portion 14 may be configured to move in the Y direction illustrated in FIG. 1. In addition, the moving portion 14 may be configured to move the placing portion 12 and the antenna 13 in the Z direction illustrated in FIG. 1. In addition, the moving portion 14 may be configured to move in two-axis direction or three-axis direction by combining X, Y, and Z directions.

Returning to FIG. 1, the POS terminal 20 is an information processing device that executes registering, settling, and the like of commodities to be purchased by a customer based on tag information read by the reading device 10. The POS terminal 20 is installed, for example, on the top plate of a check-out counter C1 and is connected so as to be capable of communicating with the reading device 10 by wire or wireless.

The POS terminal 20 includes a first display 21, a second display 22, a keyboard 23, a printer 24, and a drawer 25.

The first display 21 is a display device for an operator (clerk) who operates the POS terminal 20, and is attached above the keyboard 23. The second display 22 is a display device for a customer, and is attached to the first display 21 so as to face a rear surface. The first display 21 and the second display 22 display information on the commodity and the like read by the reading device 10 under the control of a control unit of a computer configuration (not illustrated). The first display 21 and the second display 22 may be touch panel displays.

The keyboard 23 is a user interface operated by the operator of the POS terminal 20 and includes various operation keys. For example, the keyboard 23 includes a numeric key, a reading start key for instructing start of reading of the commodity M1 (RFID tag T1), a settlement key for instructing the start of settling, and the like.

The printer 24 is a printer device such as a thermal printer. The printer 24 issues a receipt in which the content of one transaction is printed on a predetermined sheet under the control of the control unit of the POS terminal 20. The drawer 25 includes a drawer capable of opening and closing, and accommodates cash and the like in the drawer.

In the commodity sales data processing apparatus 1 of FIG. 1, a customer who purchases the commodity M1 places the commodity M1 or the shopping basket BK inputting the commodity M1 on the placing portion 12. The reading device 10 reads the tag information from the RFID tag T1 of the commodity M1 placed on the placing portion 12 and outputs the read tag information to the POS terminal 20.

Based on the tag information input from the reading device 10, the POS terminal 20 specifies commodity information (commodity name, price and the like) of the commodity M1 corresponding to commodity code included in the tag information from a commodity master and registers the commodity information as the commodity M1 that the customer purchases. Such a commodity master is a data table in which the commodity code of each commodity M1 and the commodity information of the commodity M1 are registered in association with each other, and the commodity master is stored in advance in the POS terminal 20, the server device, or the like. The POS terminal 20 executes settling of settling the amount of the registered commodity M1 with the amount paid by the customer and issues a breakdown of the transaction as a receipt.

Figure 3:
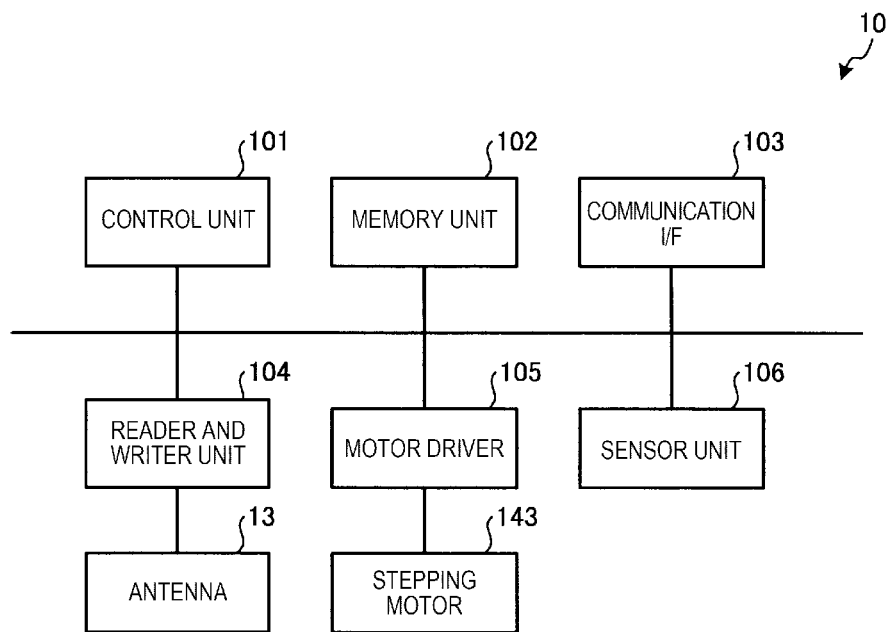
FIG. 3 is a diagram illustrating an example of a hardware arrangement of the reading device according to the at least one embodiment.

Next, with reference to FIG. 3, a hardware configuration of the reading device 10 will be described. FIG. 3 is a diagram illustrating an example of the hardware arrangement of the reading device 10.

The reading device 10 includes the control unit 101 with a computer configuration including a central processing unit (CPU), a read only memory (ROM), a random access memory (RAM), and the like. The CPU is a processor of the reading device 10. The ROM stores various programs executed by the CPU and various data. The RAM temporarily stores data and programs if the CPU executes various programs.

A memory unit 102, a communication I/F 103, the reader and writer unit 104, a motor driver 105, the sensor unit 106, and the like are connected to the control unit 101 via various input and output circuits (not illustrated).

The memory unit 102 is a memory device including a nonvolatile memory medium such as a hard disk drive (HDD), a solid state memory (SSD), or a flash memory. The memory unit 102 stores various programs and various data relating to the operation of the reading device 10. For example, the memory unit 102 stores setting information such as a movement pattern and a threshold value described later.

The communication I/F 103 is a communication interface for communicating with the POS terminal 20.

The reader and writer unit 104 is a reader and writer device of the RFID tag T1, and includes electronic circuits (none of these are illustrated) such as a DA converter, an AD converter, a modulator and demodulator, a phase synchronization circuit, and an amplifier circuit. The reader and writer unit 104 communicates with the RFID tag T1 via the antenna 13 under the control of the control unit 101, thereby reading tag information held by the RFID tag T1 and writing data to the RFID tag T1.

Specifically, the reader and writer unit 104 transmits a radio wave (hereinafter referred to as interrogation wave) on which predetermined data (command) are modulated and superimposed via the antenna 13. The reader and writer unit 104 receives the radio wave (hereinafter referred to as response wave) transmitted from the RFID tag T1 in response to the interrogation wave via the antenna 13, and demodulates and acquires the data (tag information) superimposed on the response wave. The reader and writer unit 104 repeatedly transmits an interrogation wave (such as 100 times per second) during the reading operation of the RFID tag T1.

In addition, the reader and writer unit 104 cooperates with a reading control unit 113 described later, thereby acquiring phase information of the received response wave. The phase information is information indicating the phase of the response wave. For example, the reader and writer unit 104 acquires the phase difference between the interrogation wave and the response wave as phase information. The phase information acquisition method is not particularly limited and may be acquired using a known technique. In addition, the modulation method is not particularly limited, and a modulation method capable of acquiring the phase information such as an amplitude-shift keying (ASK) method is used.

The motor driver 105 is a driver circuit for operating the stepping motor 143 of the moving portion 14. The motor driver 105 outputs a pulse signal for rotating the stepping motor 143 under the control of the control unit 101.

The sensor unit 106 is, for example, a distance measuring sensor, an encoder, or the like, and senses (measures) the position of the moving stage 145 (antenna 13) a movement route (screw shaft 141). In addition, the sensor unit 106 outputs the sensing result to the control unit 101.

Figure 4:
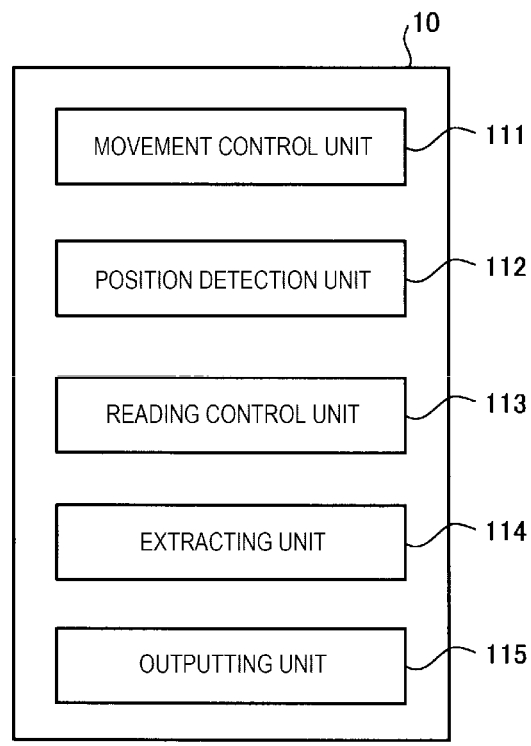
FIG. 4 is a diagram illustrating an example of a functional arrangement of the reading device according to the at least one embodiment.

Next, with reference to FIG. 4, a functional configuration of the reading device 10 will be described. FIG. 4 is a diagram illustrating an example of the functional configuration of the reading device 10.

The reading device 10 includes a movement control unit 111, a position detection unit 112, the reading control unit 113, an extracting unit 114, and an outputting unit 115 as functional units. A portion or entire of these functional units may be a software configuration realized by the control unit 101 (CPU) executing a program stored in the memory unit 102. In addition, a portion or entire of these functional units may be a hardware configuration realized by a dedicated circuit or the like provided in the reading device 10.

The movement control unit 111 cooperates with the motor driver 105 to control the movement of the moving stage 145. More specifically, if instructed to start reading from the POS terminal 20 or the like, the movement control unit 111 moves the moving stage 145 with a predetermined movement pattern.

The movement pattern can be set to any pattern without any particular limitation. The movement pattern may indicate a movement route from a movement start position (home position) at which movement starts to a movement end position at which movement is ended. For example, the movement pattern may be such that a position A1 illustrated in FIG. 2 is taken as the movement start position and is moved from the position A1 toward a position A2. In addition, the movement pattern may be a pattern which reciprocates a predetermined number of times between the position A1 and the position A2. In addition, the movement pattern may be such that a position A3 illustrated in FIG. 2 is set as the movement start position, and is moved from the position A3 to the position A1, the position A1 to the position A2, and the position A2 to the position A3. In addition, the movement pattern may indicate the moving speed (such as 50 mm/s) of the moving stage 145.

The position detection unit 112 detects the position (hereinafter referred to as antenna position) of the moving stage 145 on the movement route (screw shaft 141) based on the sensing result of the sensor unit 106. The antenna position is detected, for example, as a coordinate position on the movement route or a separation distance from the movement start position.

The reading control unit 113 is an example of a reading unit. The reading control unit 113 cooperates with the reader and writer unit 104 to read the tag information from the RFID tag T1.

Specifically, the reading control unit 113 reads the RFID tag T1 while the placing portion 12 and the antenna 13 (moving stage 145) are being moved by the movement control unit 111. If the reading control unit 113 reads the tag information via the reader and writer unit 104, the reading control unit 113 holds the read tag information in the RAM or the like. In addition, the reading control unit 113 holds a tag identifier included in the read tag information, an antenna position when reading the tag information, and the phase information of the response wave obtained when reading in association with each other in the RAM or the like. Hereinafter, a pair of the tag identifier, the reading position, and the phase information is referred to as reading result data.

The extracting unit 114 is an example of an extraction unit. The extracting unit 114 extracts the tag identifier of the RFID tag T1 attached to the commodity M1 to be read among the tag identifiers of the RFID tag T1 read by the reading control unit 113.

Specifically, the extracting unit 114 calculates the amount of change in the phase information on a per tag identifier basis based on the reading result data obtained when reading the RFID tag T1.

There is no particular limitation on the calculation method of the amount of change, and various methods can be used. For example, the extracting unit 114 may calculate the difference between the maximum value and the minimum value of the phase information as the amount of change in the phase information. In addition, the extracting unit 114 may calculate a standard deviation or an average deviation of the phase information obtained at each antenna position as the amount of change in the phase information. In addition, the extracting unit 114 may calculate the amount of change in the phase information per predetermined distance as a reference based on the value of the phase information of each antenna position.

If calculating the amount of change in the phase information on a per tag identifier basis, the extracting unit 114 compares the amount of change with a predetermined threshold value. The extracting unit 114 extracts a tag identifier in which the amount of change in phase information is the threshold value or less.

Figures 5, 6:
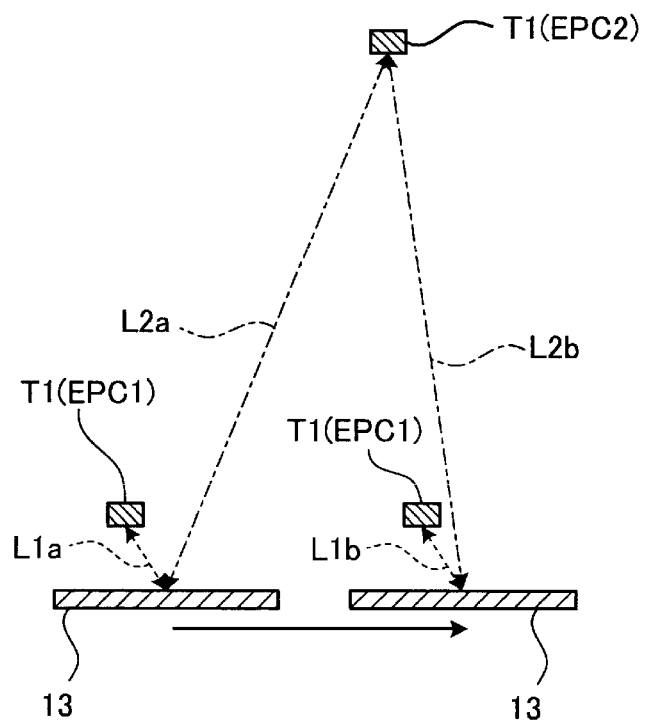
FIG. 5 is a diagram describing a relationship between an antenna and an RFID tag according to the at least one embodiment.
FIG. 6 is a table illustrating an example of reading result data according to the at least one embodiment.

Hereinafter, with reference to FIG. 5 and FIG. 6, the operation of the extracting unit 114 will be described. FIG. 5 is a diagram describing a relationship between the antenna 13 and the RFID tag T1. Here, the RFID tag T1 (EPC1) is the RFID tag T1 attached to the commodity M1 placed on the placing portion 12, that is, the RFID tag T1 attached to the commodity M1 to be read. In addition, the RFID tag T1 (EPC2) is the RFID tag T1 attached to the commodity M1 not to be read such as the commodity M1 or the like existing above the reading device 10.

As described above, in the reading device 10, the placing portion 12 and the antenna 13 are integrally moved by the moving portion 14. Therefore, before and after the movement, distances L1$a$ and L1$b$ between the RFID tag T1 (EPC1) and the antenna 13 are not substantially changed, and reading of the RFID tag T1 (EPC1) is performed while maintaining a substantially constant distance.

In addition, if the radio wave of the antenna 13 reaches the RFID tag T1 (EPC2) of the commodity M1 positioned above the placing portion 12, the antenna 13 receives the response wave of the RFID tag T1 (EPC2). In this case, as the antenna 13 moves, the arrangement position of the antenna 13 with respect to the RFID tag T1 (EPC2) changes. Therefore, before and after the movement, distances L2$a$ and L2$b$ between the RFID tag T1 (EPC2) and the antenna 13 change.

Each time the reading control unit 113 reads the tag information from each of the RFID tags T1, the tag identifier of the RFID tag T1, the antenna position, and the phase information are associated with each other and recorded as the reading result data. FIG. 6 is a table illustrating an example of the reading result data, and illustrates the reading result of the RFID tag T1 illustrated in FIG. 5.

For example, in FIG. 6, the RFID tag T1 (EPC1) is read at antenna positions of x1, x3, x4, x6 and x7, and the phase information obtained at each antenna position is recorded in association with each other. In addition, the RFID tag T1 (EPC2) is read at antenna positions x2 and x5, and the phase information obtained at each antenna position is recorded in association with each other.

Incidentally, the phase information of the response wave acquired by the reading control unit 113 (reader and writer unit 104) changes in accordance with the separation distance between the antenna 13 and the RFID tag T1. Therefore, for example, in the RFID tag T1 (EPC1), even if the antenna 13 moves, the separation distance from the antenna 13 is substantially constant, so that the phase information at each antenna position indicates substantially the same value. In the RFID tag T1 (EPC2), since the separation distance from the antenna 13 changes as the antenna 13 moves, the phase information at each antenna position indicates different values.

The extracting unit 114 extracts the tag identifier of the RFID tag T1 attached to the commodity M1 to be read among the tag identifiers obtained by reading, based on the characteristics of the phase information.

Specifically, the extracting unit 114 calculates the amount of change in the phase information on a per tag identifier (EPC1, EPC2) basis. For example, if the difference between the maximum value and the minimum value of the phase information is used as the amount of change, since the phase information of the tag identifier "EPC1" all have the same value, the extracting unit 114 calculates the amount of change of "zero". Since the maximum value of the phase information of the tag identifier "EPC2" is 155 and the minimum value thereof is 150, the extracting unit 114 calculates the amount of change of "5" from the difference.

The extracting unit 114 compares the amount of change in the phase information calculated on a per tag identifier basis with the threshold value, and extracts a tag identifier in which the amount of change is the threshold value or less as a tag identifier of the RFID tag T1 attached to the commodity M1 to be read. For example, if the threshold value is "3", the extracting unit 114 extracts the tag identifier "EPC1" of the RFID tag T1 (EPC1).

Although the threshold value can be set to any value, a value capable of discriminating between the RFID tag T1 to be read and the RFID tag T1 not to be read is set. The threshold value is preferably set according to the radio wave characteristics (wavelength, radio field intensity, or the like) of the antenna 13, the radio wave characteristics (reception sensitivity or the like) of the RFID tag T1, the moving speed, or the moving amount of the antenna 13, or the like.

As a result, the extracting unit 114 can extract (discriminate) the tag identifier of the RFID tag T1 attached to the commodity M1 to be read, that is, the tag identifier of the RFID tag T1 attached to the commodity M1 placed on the placing portion 12 among the tag information (tag identifier) read by the reading control unit 113.

The extracting unit 114 may be configured not to calculate the amount of change of the tag identifier until the number of pieces of the read result data obtained for the same tag identifier is a predetermined number (minimum acquired number) or larger. For example, if the minimum acquired number is "3", the extracting unit 114 does not calculate the amount of change for the tag identifier "EPC2" in which the number of pieces of the read result data is less than 3 and calculates the amount of change of the tag identifier "EPC1" in which the number of pieces of the read result data is 3 or more.

Returning to FIG. 4, the outputting unit 115 is an example of an output unit. The outputting unit 115 outputs tag information including the tag identifier extracted by the extracting unit 114 among the tag information read by the reading control unit 113 to the POS terminal 20 via the communication I/F 103. In addition, the outputting unit 115 performs duplication check of tag identifiers so as not to duplicate output of tag information including the same tag identifier.

The timing when the outputting unit 115 outputs the tag information is not particularly limited and can be set to any timing. For example, the outputting unit 115 may output the tag information on condition that the movement of the placing portion 12 has stopped, or the reading of the RFID tag T1 is stopped. In addition, the outputting unit 115 may output the tag information according to an output instruction (such as reading end instruction) from the POS terminal 20.

Figure 7:
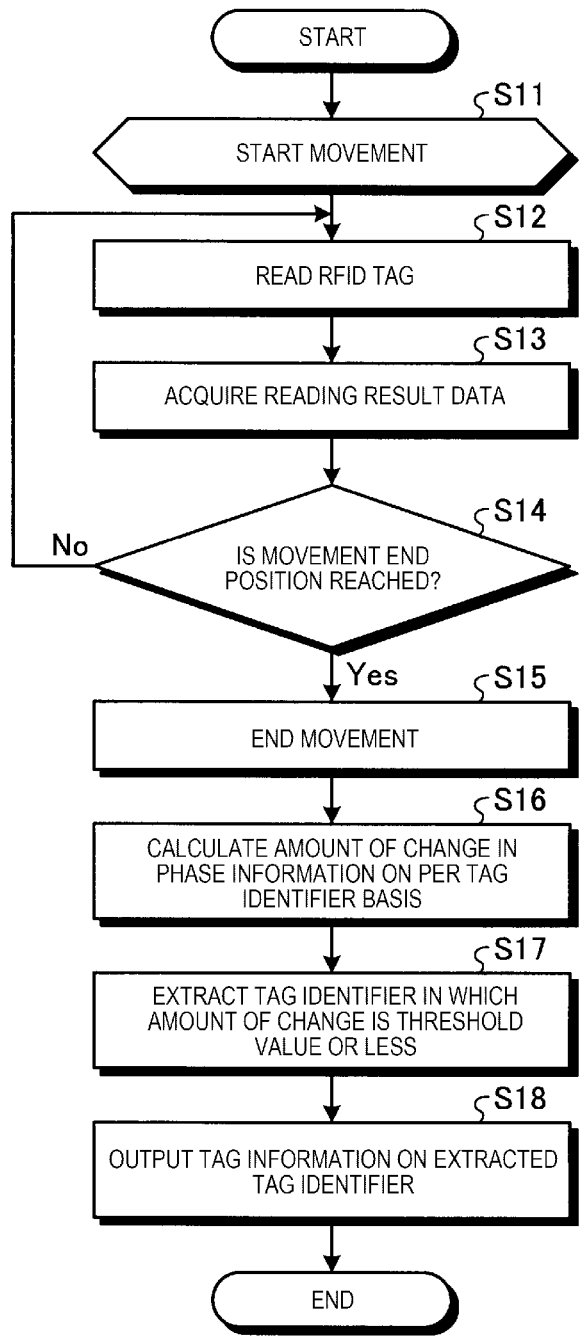
FIG. 7 is a flowchart illustrating an example of reading by the reading device according to the at least one embodiment.

Next, with reference to FIG. 7, reading by the reading device 10 will be described. FIG. 7 is a flowchart illustrating an example of the reading by the reading device 10.

First, the movement control unit 111 of the reading device 10 starts movement of the moving stage 145 in response to an instruction to start reading (Act 11). As a result, the placing portion 12 and the antenna 13 are integrally moved with a predetermined movement pattern.

An instruction to start reading may be configured to input from the POS terminal 20 or may be configured to receive an instruction independently from the reading device 10 side. In the latter case, for example, the reading device 10 may have an operating element for instructing the start of reading and receive an operation on the operating element. In addition, a sensor (such as a weight sensor) for detecting that the commodity M1 or the shopping basket BK is placed on the placing portion 12 may be configured to be provided and to accept the detection of placement by the sensor as an instruction to start reading.

The reading control unit 113 starts reading of the RFID tag T1 as the movement of Act 11 starts (Act 12). Upon reading the tag information from the RFID tag T1, the reading control unit 113 acquires the tag identifier, the antenna position, and the phase information as reading result data (Act 13).

Subsequently, the movement control unit 111 determines whether or not the moving stage 145 is moved to the movement end position of the movement pattern (Act 14). If the movement end position is not reached (Act 14; No), the movement control unit 111 returns the processing to Act 12 and continues the movement of the moving stage 145.

If the movement end position is reached (Act 14; Yes), the movement control unit 111 stops (ends) the movement of the moving stage 145 (Act 15). The reading control unit 113 ends the reading of the RFID tag T1 as the movement is stopped. That is, the reading control unit 113 executes reading of the RFID tag T1 while the placing portion 12 and the antenna 13 are integrally moved.

Subsequently, the extracting unit 114 calculates the amount of change in the phase information on a per tag identifier basis based on the acquired reading result data (Act 16). Next, the extracting unit 114 compares the calculated amount of change on a per tag identifier basis with the threshold value, and extracts a tag identifier in which the amount of change is the threshold value or less (Act 17).

The outputting unit 115 outputs the tag information including the extracted tag identifier to the POS terminal 20 (Act 18), and ends this processing. If there is no tag identifier in which the amount of change in the phase information is the threshold value or less, the outputting unit 115 does not output the tag information to the POS terminal 20, and this processing is ended.

As described above, the reading device 10 compares the amount of change in the phase information obtained from each of the RFID tags T1 with the threshold value, and extracts a tag identifier in which the amount of change is the threshold value or less. The reading device 10 outputs the tag information including the extracted tag identifier to the POS terminal 20 as a reading result.

As a result, the reading device 10 can output the tag information of the commodity M1 placed on the placing portion 12 to the POS terminal 20, so that reading of the RFID tag T1 attached to the commodity M1 to be read can be performed efficiently.

Second Embodiment

Next, a another embodiment will be described. In the first embodiment described above, the arrangement in which the moving portion 14 moves the placing portion 12 and the antenna 13 is described. In the second embodiment, a configuration in which the placing portion 12 and the antenna 13 are integrally moved by receiving an external force will be described. Constituent elements similar to those of the first embodiment are denoted by the same reference numerals and description thereof is omitted.

Figure 8:
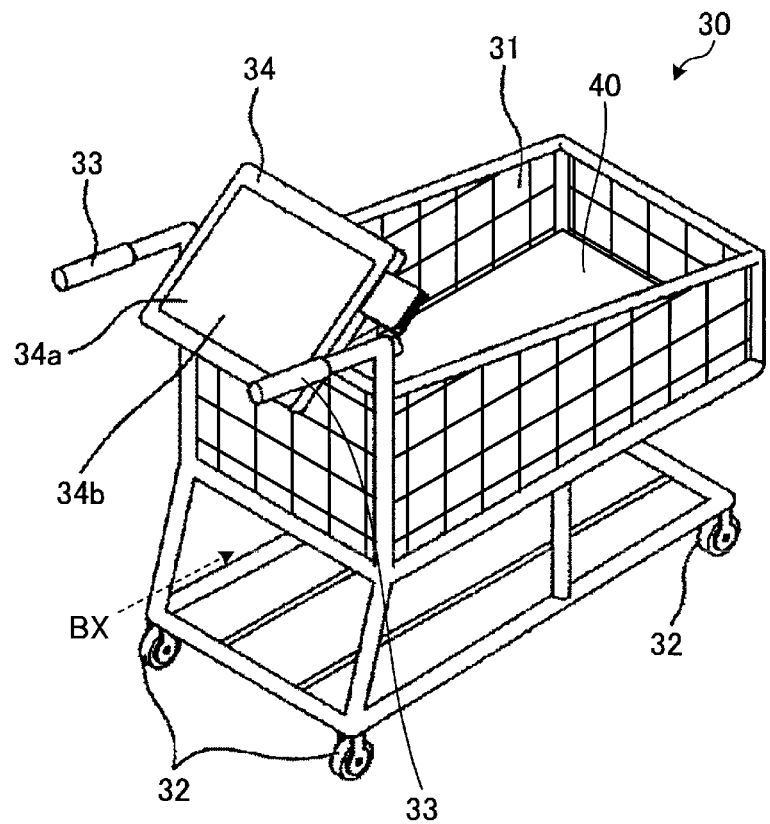
FIG. 8 is a view illustrating an example of an appearance arrangement of a shopping cart provided with a reading device according to at least one embodiment.

FIG. 8 is a view illustrating an example of an appearance configuration of a shopping cart 30 provided with a reading device 40 according to a second embodiment. As illustrated in FIG. 8, the shopping cart 30 includes a storage portion 31, a moving caster portion 32 disposed below the storage portion 31, a handle portion 33 which is connected to the storage portion 31 and which the customer grips when moving the shopping cart 30.

The storage portion 31 has a cage-like shape with the upper surface opened. The customer using the shopping cart 30 stores the commodity M1 to be purchased and the shopping basket BK for storing the commodity M1 in the storage portion 31.

In addition, the reading device 40 is provided on the bottom surface of the storage portion 31. The reading device 40 has a flat plate shape (thin box shape) and is provided along the bottom surface of the storage portion 31. The reading device 40 may be detachably attached to the storage portion 31 of the shopping cart 30.

Figure 9:
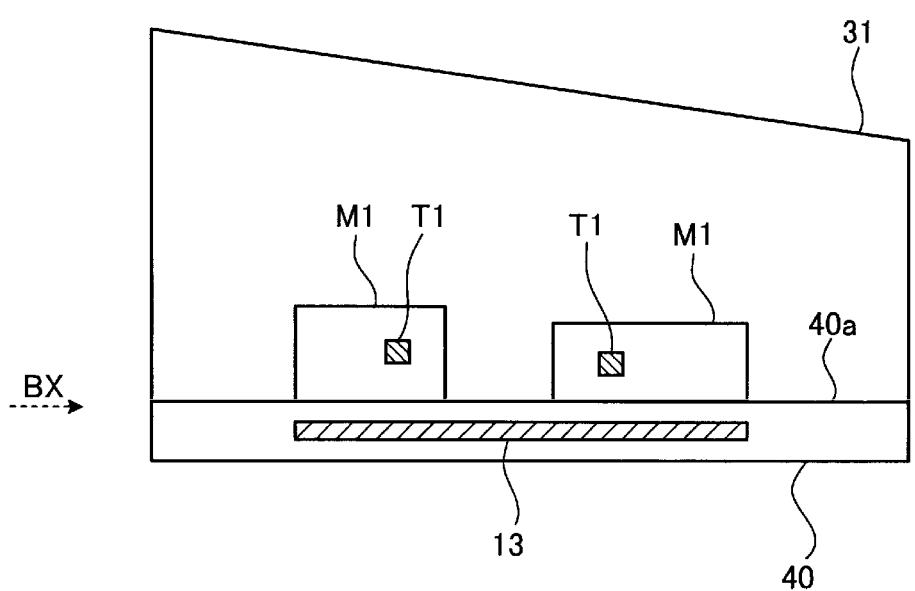
FIG. 9 is a diagram illustrating a schematic arrangement of the reading device according to the at least one embodiment.

FIG. 9 is a diagram illustrating a schematic configuration of the reading device 40 (viewed in the direction of arrow BX in FIG. 8). As illustrated in FIG. 9, the commodity M1 stored in the storage portion 31, the shopping basket BK (not illustrated) storing the commodity M1, and the like are placed on the upper surface (placing surface 40a) of the reading device 40. That is, the reading device 40 functions as a placing table, and the commodity M1 to be read is placed on the placing surface 40a. The placing surface 40a is formed of a radio wave transmitting material.

In addition, the reading device 40 has the antenna 13. Specifically, the antenna 13 is provided under the placing surface 40a, and emits radio waves toward the placing surface 40a, thereby forming a communication area (not illustrated) capable of communicating with the RFID tag T1 on the placing surface 40a. The intensity of the radio wave emitted from the antenna 13 is not particularly limited, and is preferably set to the extent that the formed communication area can cover the storage portion 31.

Returning to FIG. 8, in the shopping cart 30, a tablet terminal 34 is attached to a portion of the handle portion 33 side of a frame forming the storage portion 31.

The tablet terminal 34 is a terminal device including a computer configuration such as a CPU, a ROM, and a RAM. The tablet terminal 34 includes a display 34a, a touch panel 34b, and the like. The display 34a is configured to include a display device such as a liquid crystal display (LCD) and displays various types of information. The touch panel 34b is attached to the display screen of the display 34a and receives an input operation on the display screen.

The tablet terminal 34 displays various types of information on the display 34a and executes processing according to the operation contents accepted via the touch panel 34b. For example, based on the tag information input from the reading device 40, the tablet terminal 34 specifies the commodity information of the commodity M1 corresponding to the commodity code included in the tag information from the commodity master, and displays the specified commodity information on the display 34a.

Figure 10:
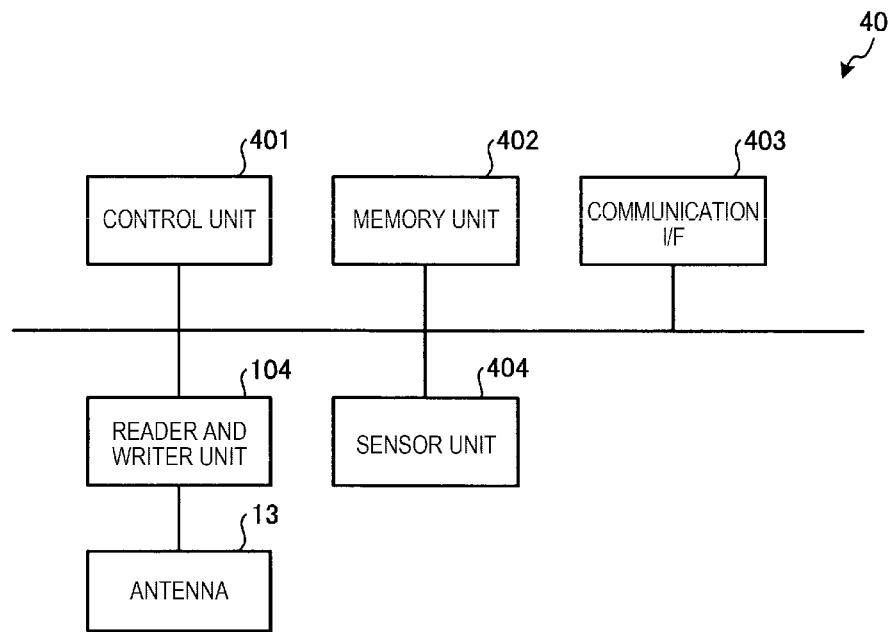
FIG. 10 is a diagram illustrating an example of a hardware arrangement of the reading device according to the at least one embodiment.

FIG. 10 is a diagram illustrating an example of a hardware configuration of the reading device 40. As illustrated in FIG. 10, the reading device 40 includes a control unit 401 having a computer configuration including a CPU, a ROM, a RAM, and the like. The CPU is a processor of the reading device 40. The ROM stores various programs executed by the CPU and various data. The RAM temporarily stores data and programs if the CPU executes various programs.

A memory unit 402, a communication I/F 403, a sensor unit 404, the reader and writer unit 104, and the like are connected to the control unit 401 via various input and output circuits (not illustrated).

The memory unit 402 is a memory device including a nonvolatile memory medium such as an HDD, an SSD, or a flash memory. The memory unit 402 stores various programs and various data relating to the operation of the reading device 40. For example, the memory unit 402 stores setting information such as a threshold value.

The communication I/F 403 is a communication interface for communicating with the tablet terminal 34.

The sensor unit 404 is, for example, an acceleration sensor, a speed sensor, or the like, and detects that the shopping cart 30 (reading device 40) is moving.

The reading device 40 includes the control unit 401, the memory unit 402, the communication I/F 403, the sensor unit 404, and the reader and writer unit 104 described above in the housing. The configuration of the reading device 40 is not limited to the example of FIG. 10. For example, the reading device 40 may include a power supply (not illustrated) such as a secondary battery.

Figure 11:
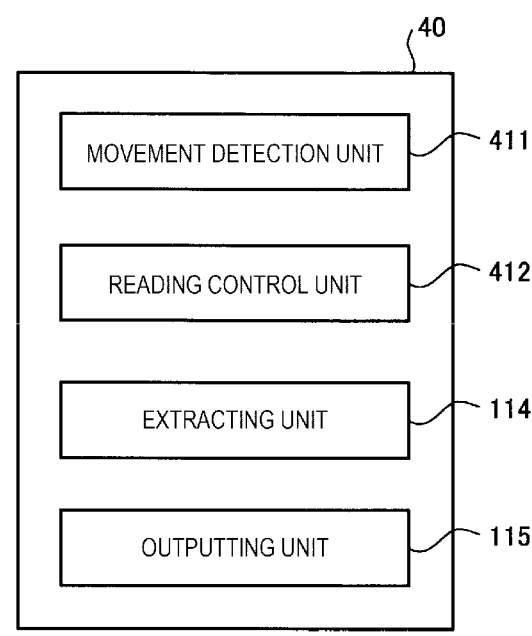
FIG. 11 is a diagram illustrating an example of a functional arrangement of the reading device according to the at least one embodiment.

Next, with reference to FIG. 11, a functional arrangement of the reading device 40 will be described. FIG. 11 is a diagram illustrating an example of the functional arrangement of the reading device 40.

The reading device 40 includes a movement detection unit 411, a reading control unit 412, the extracting unit 114, and the outputting unit 115 as functional units. A portion or entire of these functional units may be a software configuration realized by the control unit 401 (CPU) executing the program stored in the memory unit 402. In addition, a portion or entire of these functional units may be a hardware configuration realized by a dedicated circuit or the like provided in the reading device 40.

The movement detection unit 411 is an example of a detection unit. The movement detection unit 411 detects that the shopping cart 30 (reading device 40) is moving or stationary based on the sensing result of the sensor unit 404.

The reading control unit 412 is an example of a reading unit. The reading control unit 412 cooperates with the reader and writer unit 104 to read the tag information from the RFID tag T1.

Specifically, the reading control unit 412 reads the RFID tag T1 while the movement detection unit 411 determines that the shopping cart 30 (reading device 40) is moving. If the reading control unit 412 reads the tag information via the reader and writer unit 104, the reading control unit 412 holds the read tag information in the RAM or the like. In addition, the reading control unit 412 holds the reading result data in which the tag identifier included in the read tag information and the phase information of the response wave obtained when reading are associated with each other in the RAM or the like. The extracting unit 114 extracts the tag identifier of the RFID tag T1 attached to the commodity M1 to be read among the tag identifiers of the RFID tag T1 read by the reading control unit 412.

Specifically, the extracting unit 114 calculates the amount of change in the phase information on a per tag identifier basis based on the reading result data obtained when reading the RFID tag T1. If calculating the amount of change in the phase information on a per tag identifier basis, the extracting unit 114 compares the amount of change with a predetermined threshold value. The extracting unit 114 extracts a tag identifier in which the amount of change in phase information is the threshold value or less.

Here, the operation of reading the RFID tag T1 when moving the shopping cart 30 (reading device 40) corresponds to the operation of reading the RFID tag T1 when moving the moving stage 145 as described in the first embodiment. That is, by reading the RFID tag T1 when moving the shopping cart 30 (reading device 40), the tag identifier of the RFID tag T1 attached to the commodity M1 to be read can be extracted, based on the characteristics of the phase information described in FIGS. 5 and 6.

Although the threshold value can be set to any value, a value capable of discriminating between the RFID tag T1 to be read and the RFID tag T1 not to be read is set. The threshold value is preferably set according to the radio wave characteristics (wavelength, radio field intensity, or the like) of the antenna 13, the radio wave characteristics (reception sensitivity or the like) of the RFID tag T1, or the like.

The outputting unit 115 outputs tag information including the tag identifier extracted by the extracting unit 114 among the tag information read by the reading control unit 412 to the tablet terminal 34 via the communication I/F 103. In addition, the outputting unit 115 performs duplication check of tag identifiers so as not to duplicate output of tag information including the same tag identifier.

Next, with reference to FIG. 12, reading by the reading device 40 will be described. FIG. 12 is a flowchart illustrating an example of reading by the reading device 40.

First, the reading control unit 412 determines whether or not the shopping cart 30 is moving based on the detection result of the movement detection unit 411 (Act 31). If the shopping cart 30 is stationary (Act 31; No), the reading control unit 412 waits until the shopping cart 30 is moved.

If the shopping cart 30 is moving (Act 31; Yes), the reading control unit 412 starts reading the RFID tag T1 (Act 32). Upon reading the tag information from the RFID tag T1, the reading control unit 412 acquires the tag identifier and the phase information as reading result data (Act 33).

Subsequently, the extracting unit 114 calculates the amount of change in the phase information on a per tag identifier basis based on the acquired reading result data (Act 34). Next, the extracting unit 114 compares the calculated amount of change on a per tag identifier basis with the threshold value, and extracts a tag identifier in which the amount of change is the threshold value or less (Act 35). The extracting unit 114 may be arranged not to calculate the amount of change of the tag identifier until the number of pieces of the read result data obtained for the same tag identifier is a minimum acquired number or larger.

The outputting unit 115 outputs the tag information including the extracted tag identifier to the tablet terminal 34 (Act 36), and returns the processing to Act 31.

As described above, the reading device 40 of the embodiment compares the amount of change in the phase information obtained from each of the RFID tags T1 with the threshold value, and extracts a tag identifier in which the amount of change is the threshold value or less. The reading device 40 outputs the tag information including the extracted tag identifier to the tablet terminal 34 as a reading result.

As a result, the reading device 40 can output the tag information of the commodity M1 stored in the storage portion 31 to the tablet terminal 34, so that reading of the RFID tag T1 attached to the commodity M1 to be read can be performed efficiently.

In the reading of FIG. 12, the outputting unit 115 is configured to immediately output the tag information including the extracted tag identifier, and the timing of the output is not limited thereto. For example, the outputting unit 115 may output the tag information while the shopping cart 30 is stationary. In addition, the outputting unit 115 may be configured to start outputting on condition that output is instructed from an external device such as the tablet terminal 34.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the first embodiment, the radio wave characteristics (such as wavelength, frequency) of radio waves emitted from the antenna 13 may be switched between the outgoing and return passes of the moving stage 145. It is assumed that the outputting unit 115 calculates the amount of change in the phase information using the reading result data acquired under the same radio wave characteristic.

In addition, in the first embodiment, the functional unit of the reading device 10 executes the reading, and the functional unit of the POS terminal 20 may execute the reading. In this case, the POS terminal 20 has each functional unit illustrated in FIG. 4 and functions as a reading device with the reading device 10.

In addition, in the second embodiment, the moving object that moves the reading device 40 is the shopping cart 30, and the type of the moving object is not limited thereto. For example, the moving object may be a cart such as a truck or a truck for basket. In addition, the moving object may be the shopping basket BK. In this case, the reading device 40 is provided on the bottom surface of the shopping basket BK and is moved with the shopping basket BK.

In addition, in the second embodiment, the reading device 40 is provided with the sensor unit 404, and the reading device 40 may detect (determine) whether or not the shopping cart 30 is moving by another method. For example, if the tablet terminal 34 has the same function as the sensor unit 404, the reading device 40 may detect (determine) whether or not the shopping cart 30 is moving by cooperating with the tablet terminal 34.

In addition, in the second embodiment, the reading device 40 outputs the tag information to the tablet terminal 34, and the reading device 40 may output the tag information to another device. For example, the reading device 40 may output the tag information to the POS terminal 20 in response to an output instruction from the POS terminal 20 illustrated in FIG. 1. In this case, the reading device 40 receives an instruction from an external device via the communication I/F 403 or the like.

In addition, in the second embodiment, the functional unit of the reading device 40 executes the reading, and the functional unit of the tablet terminal 34 may execute the reading. In this case, the tablet terminal 34 has each functional unit illustrated in FIG. 11 and functions as a reading device with the reading device 40.

In addition, in the above embodiment, the antenna 13 is disposed under the placing table (placing portion 12 and reading device 40), and radio waves are emitted toward the placing table, and the installation position of the antenna 13 is not limited thereto. For example, a wall portion erected in the direction perpendicular to the placing surface of the placing portion may be provided at the edge portion or in the vicinity of the placing table and radio waves may be emitted from the antenna 13 attached to the wall portion to the placing table (placing surface). In this case, the antenna 13 emits radio waves in a direction parallel to the placing surface, that is, from the lateral direction of the placing table. In addition, the moving portion 14 integrally moves the placing portion 12 and the wall portion (antenna 13).

In addition, although the programs executed by the respective devices of the above embodiments are provided in advance by being incorporated in a memory medium (ROM or the like) provided in the device, the method of providing the program is not limited thereto. For example, the program may be recorded in a computer-readable recording medium such as a CD-ROM, a flexible disk (FD), a CD-R, or a digital versatile disk (DVD) in an installable format or an executable format file and provided. Furthermore, the memory medium is not limited to a medium independent of the computer or the embedded system, but also includes a memory medium in which a program transmitted via a LAN, the Internet, or the like is downloaded and stored or temporarily stored.

In addition, the programs executed by the respective devices of the above embodiments may be stored on a computer connected to a network such as the Internet and downloaded via a network to provide the program, or the programs may be provided or distributed via a network such as the Internet.

What is claimed is:

1. A reading device comprising:
a placing table arranged to support an article to which an RFID tag is attached;
an antenna configured to emit a radio wave for communicating with the RFID tag toward the placing table;
a reader configured to read tag information including a tag identifier identifying the RFID tag by communicating with the RFID tag via the antenna while the placing table and the antenna are integrally moved; and
a controller configured to:
extract the tag identifier in which an amount of change in phase information when comparing phases at different reading positions is a settable predetermined value or less, wherein the predetermined value can be a nonzero value, based on a phase difference between a response wave transmitted from the RFID tag in respond to an interrogation wave via the antenna when the tag information is read; and output the tag information including the tag identifier extracted by the controller.

2. The device according to claim 1, wherein the controller is configured to integrally move the placing table and the antenna, wherein the reader is configured to execute reading of the tag information while the placing table and the antenna are integrally moved by the controller.

3. The device according to claim 2, wherein the controller is configured to integrally move the placing table and the antenna in at least one of one dimension, two dimensions or three dimensions.

4. The device according to claim 1, wherein the reading device is attached to a moving object which moves by receiving an external force, and the reader executes reading of the tag information while the moving object is moving.

5. The device according to claim 4, wherein the moving object comprises at least one of a shopping cart or a truck.

6. The device according to claim 4, further comprising:

a sensor configured to detect whether or not the moving object is moving, wherein the reader is configured to execute reading of the tag information while the detecting unit detects that the moving object is moving.

7. The device according to claim 6, wherein the moving object comprises at least one of a shopping cart or a truck.

8. The device according to claim 1, wherein the placing table is formed of a radio wave permeable member, and the antenna is provided below the placing table and emits the radio wave toward the placing table.

9. The device according to claim 1, wherein the read tag information includes commodity information regarding the article.

10. The device according to claim 1, wherein the amount of change in phase information is one of a difference, a standard deviation, or an average deviation in phase information.

11. The device according to claim 1, wherein the controller is configured to not calculate the amount of change in phase information until the number of pieces of tag information read for the same tag identifier is at least a predetermined number.

12. A method for operating a reading device, the reading device including a placing table arranged to support an article to which an RFID tag is attached, and an antenna configured to emit a radio wave for communicating with the RFID tag toward the placing table, the method comprising:

reading tag information including a tag identifier identifying the RFID tag by communicating with the RFID tag via the antenna while the placing table and the antenna are integrally moved;

extracting the tag identifier in which an amount of change in phase information when comparing phases at different reading positions is a settable predetermined value or less, wherein the predetermined value is a nonzero value, based on a phase difference between a response wave transmitted from the RFID tag in respond to an interrogation wave via the antenna when the tag information is read; and outputting the tag information including the extracted tag identifier.

13. The method according to claim 12, wherein the reading of the tag information is executed while the placing table and the antenna are integrally moved.

14. The method according to claim 13, wherein the placing table and the antenna are moved in at least one of one dimension, two dimensions or three dimensions.

15. The method according to claim 12, wherein the reading device is attached to a moving object which moves by receiving an external force, and further comprising reading the tag information while the moving object is moving.

16. The method according to claim 12, wherein the placing table is formed of a radio wave permeable member, and the antenna is provided below the placing table and emits the radio wave toward the placing table.

17. The method according to claim 12, wherein the read tag information includes commodity information regarding the article.

18. The method according to claim 12, wherein the amount of change in phase information is one of a difference, a standard deviation, or an average deviation in phase information.

19. The method according to claim 12, wherein the amount of change in phase information is not calculated until the number of pieces of tag information read for the same tag identifier is at least a predetermined number.

20. An information processing device, comprising:

a point of sale terminal; and a reading device, the reading device comprising:

a placing table arranged to support an article to which an RFID tag is attached;

an antenna configured to emit a radio wave for communicating with the RFID tag toward the placing table;

a reader configured to read tag information including a tag identifier identifying the RFID tag by communicating with the RFID tag via the antenna while the placing table and the antenna are integrally moved; and a controller configured to:

extract the tag identifier in which an amount of change in phase information when comparing phases at different reading positions is a settable predetermined value or less, wherein the predetermined value is a nonzero value, based on a phase difference between a response wave transmitted from the RFID tag in respond to an interrogation wave via the antenna when the tag information is read; and output the tag information including the tag identifier extracted by the controller to the point of sale terminal.

* * * * *